(12) United States Patent
Otto

(10) Patent No.: US 11,600,176 B2
(45) Date of Patent: Mar. 7, 2023

(54) COMMUNICATIONS SYSTEM HAVING A COMMUNICATIONS ADAPTER AND A COORDINATION DEVICE, AND COMMUNICATIONS ADAPTER, COORDINATION DEVICE AND METHOD FOR CARRYING OUT A COMMUNICATION

(71) Applicant: AUDI AG, Ingolstadt (DE)

(72) Inventor: Moritz Otto, Möckmühl (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/618,289

(22) PCT Filed: May 15, 2020

(86) PCT No.: PCT/EP2020/063567
§ 371 (c)(1),
(2) Date: Dec. 10, 2021

(87) PCT Pub. No.: WO2020/249357
PCT Pub. Date: Dec. 17, 2020

(65) Prior Publication Data
US 2022/0270482 A1 Aug. 25, 2022

(30) Foreign Application Priority Data
Jun. 11, 2019 (DE) ..................... 10 2019 208 424.9

(51) Int. Cl.
*G08G 1/0967* (2006.01)
*B60W 60/00* (2020.01)
(Continued)

(52) U.S. Cl.
CPC ..... *G08G 1/096708* (2013.01); *B60W 60/001* (2020.02); *G08G 1/096775* (2013.01);
(Continued)

(58) Field of Classification Search
CPC .......... G08G 1/096708; B60W 60/001; B60W 2556/45; B60W 2554/4046;
(Continued)

(56) References Cited

U.S. PATENT DOCUMENTS 9,805,601 B1 * 10/2017 Fields .............. G08G 1/096827
10,872,379 B1 * 12/2020 Nepomuceno ... G08G 1/096775
(Continued)

FOREIGN PATENT DOCUMENTS

| CN | 107004091 A | 8/2017 |
|---|---|---|
| DE | 20 2004 021 239 U1 | 5/2007 |

(Continued)

OTHER PUBLICATIONS

International Preliminary Reporting on Patentability for International Patent Application No. PCT/EP2020/063567 dated Dec. 16, 2021 (9 pages).
(Continued)

*Primary Examiner* — Peter D Nolan
*Assistant Examiner* — Wae L Louie
(74) *Attorney, Agent, or Firm* — Staas & Halsey LLP

(57) ABSTRACT

A communication system includes a motor vehicle, a portable communication adapter separate from the motor vehicle and able to be coupled reversibly to a control device of the motor vehicle via a communication interface, and a vehicle-external coordination device. The communication adapter receives motor vehicle data describing a traffic behavior and/or a traffic environment of the motor vehicle from the control device. The communication adapter includes a transmission/reception unit and transmits the motor vehicle data to the vehicle-external coordination device via the transmission/reception unit and receives warning data generated by the vehicle-external coordination device which describes a traffic behavior and/or a traffic (Continued)

environment of another motor vehicle. The communication adapter initiates a traffic-coordinating measure based on the warning data.

17 Claims, 2 Drawing Sheets

(51) Int. Cl.
*H04W 12/63* (2021.01)
*H04W 12/06* (2021.01)

(52) U.S. Cl.
CPC ............ *H04W 12/06* (2013.01); *H04W 12/63* (2021.01); *B60W 2540/10* (2013.01); *B60W 2540/12* (2013.01); *B60W 2540/18* (2013.01); *B60W 2540/20* (2013.01); *B60W 2554/4046* (2020.02); *B60W 2556/45* (2020.02)

(58) Field of Classification Search
CPC ......... B60W 2540/10; B60W 2540/12; B60W 2540/18; B60W 2540/20; H04W 12/63; H04W 12/06
See application file for complete search history.

(56) References Cited

U.S. PATENT DOCUMENTS

| | | | | |
|---|---|---|---|---|
| 2004/0233045 | A1* | 11/2004 | Mays ............... | G08G 1/096775 340/901 |
| 2014/0306834 | A1* | 10/2014 | Ricci ................. | G08B 25/016 340/902 |
| 2015/0061895 | A1* | 3/2015 | Ricci ................. | B60K 28/00 340/902 |
| 2017/0048080 | A1* | 2/2017 | Grimm ............... | H04W 12/106 |
| 2018/0054843 | A1* | 2/2018 | Stählin ............... | H04W 4/46 |
| 2018/0090001 | A1* | 3/2018 | Fletcher ........... | G08G 1/096725 |
| 2019/0068712 | A1* | 2/2019 | Chen ................. | G07C 5/008 |
| 2019/0082377 | A1* | 3/2019 | Silver ............... | H04W 4/027 |
| 2020/0290638 | A1* | 9/2020 | Damnjanovic ....... | B60W 50/14 |
| 2021/0136570 | A1* | 5/2021 | Paladugu ............ | H04W 4/70 |

FOREIGN PATENT DOCUMENTS

| | | |
|---|---|---|
| DE | 10 2007 006 227 A1 | 8/2008 |
| DE | 10 2016 214 915 A1 | 2/2017 |
| DE | 20 2017 000 293 U1 | 3/2017 |
| DE | 10 2017 009 722 A1 | 3/2018 |
| DE | 10 2017 200 842 A1 | 7/2018 |
| DE | 10 2017 130 628 A1 | 7/2019 |
| DE | 10 2019 208 424.9 | 12/2020 |
| WO | PCT/EP2020/063567 | 5/2020 |

OTHER PUBLICATIONS

German Search Report for German Patent Application No. 10 2019 208 424.9 dated Apr. 2, 2020 (10 pages).
International Search Report for International Patent Application No. PCT/EP2020/063567 dated Sep. 8, 2020 (Forms PCT/ISA/220, PCT/ISA/210, PCT/ISA/237; 23 pages including translation).
VJOYCAR: "Head Up Display User Manual" (Link: http://www.vjoychina.com/wp-content/uploads/2016/09/W02-OBD-Hud-USER-MANUAL.pdf) (Retrieved Aug. 21, 2020) (11 pages).
European Search Report dated Apr. 26, 2022 in European Patent Application No. 20 727 195.8 (6 pages).
Office Action dated May 25, 2022 in related Chinese Patent Application No. 202080042469.5 (10 pages).
European Examination Report dated Oct. 6, 2022 in European Patent Application No. 20 727 195.8 (7 pages).
$2^{nd}$ Office Action dated Dec. 2, 2022 in related Chinese Patent Application No. 202080042469.5 (8 pages).
Pending Claims of parallel European Patent Application No. 20727195.8 as of Dec. 28, 2022. (3 pages).

* cited by examiner

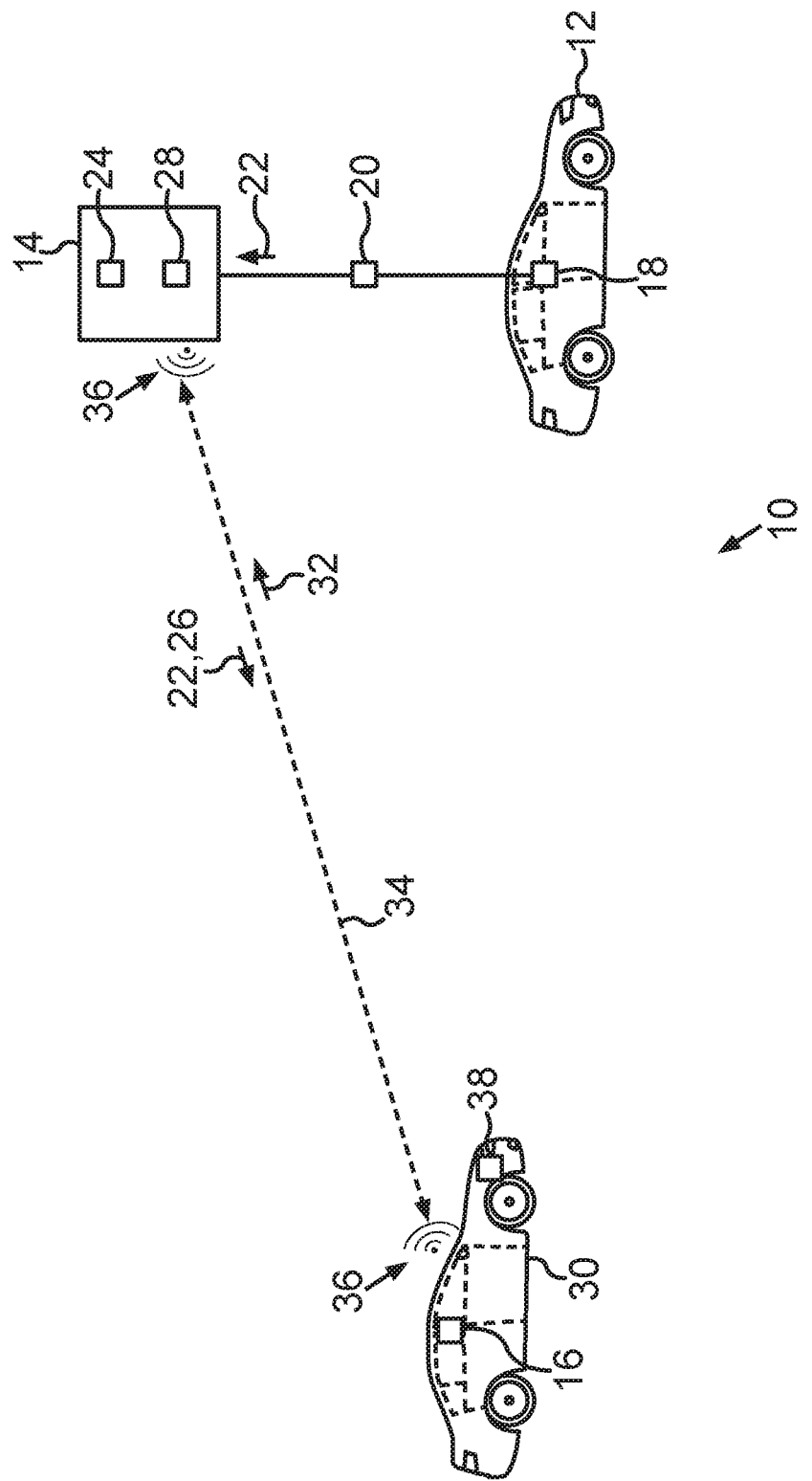

COMMUNICATIONS SYSTEM HAVING A COMMUNICATIONS ADAPTER AND A COORDINATION DEVICE, AND COMMUNICATIONS ADAPTER, COORDINATION DEVICE AND METHOD FOR CARRYING OUT A COMMUNICATION

CROSS REFERENCE TO RELATED APPLICATIONS

This application is a U.S. national stage of International Application No. PCT/EP2020/063567, filed on May 15, 2020. The International Application claims the priority benefit of German Application No. 10 2019 208 424.9 filed on Jun. 11, 2019. Both International Application No. PCT/EP2020/063567 and German Application No. 10 2019 208 424.9 are incorporated by reference herein in their entirety.

BACKGROUND

Described herein is a communication system having a motor vehicle, a communication adapter, and a coordination device. The communication adapter is designed as a portable communication adapter external to the vehicle and able to be coupled reversibly to a control device of the motor vehicle by use of a communication interface. The communication adapter is for example realized as a smartphone, a tablet PC, or a comparable mobile terminal. The coordination device is designed as a coordination device external to the vehicle, for example as a central server device.

Within the context of developing autonomous motor vehicles and networked traffic systems, for example networked traffic control systems, great significance is placed on the communication between individual road users, for example between individual, at least partly autonomous motor vehicles. A multiplicity of known methods for exchanging information between road users exists accordingly.

For example, German Patent Application No. 10 2017 009 722 A1 thus describes a method for wireless information transmission between two vehicles, wherein the vehicles are located within a predetermined distance or radius from one another. In this case, the information is transmitted between communication units, wherein a respective communication unit can be designed in the form of a smartphone. This described car-to-car communication disadvantageously involves only those road users located within a predetermined maximum distance from one another.

German Patent Application No. 10 2017 200 842 A1 describes a method for operating a traffic control infrastructure for determining a target trajectory for at least one motor vehicle. The target trajectory is determined in this case by use of a central server device depending on an environment of the motor vehicle. Disadvantageously, only those motor vehicles and/or those further road users having a correspondingly designed communication interface can be involved in the method described here.

German Patent Application No. 10 2007 006 227 A1 for its part describes an early warning system for preventive recognition and correction of defects in vehicles. To this end, data are transmitted between a respective vehicle and a central computer, which automatically evaluates the transmitted data and forwards an alarm notification to a technical control center when preprogrammed limit values are exceeded. A communication between the individual road users or vehicles is not provided.

A disadvantage in what is known is that in each case only a restricted circle of respective road users and/or vehicles can be involved in a radio-based data exchange of motor vehicle data. This disadvantageous restriction results, on the one hand, from the fact that only vehicles that are located at a predetermined distance from one another can communicate with one another. On the other hand, this restriction consists in the fact that participants in a respective communication must have the same technical basic prerequisites for communication.

SUMMARY

Described herein is an apparatus and method for enabling a communication between motor vehicles having varying or different technical communication methods or basic prerequisites for communication.

This may be achieved according to the examples described herein. Advantageous developments of the disclosure are described in the following description, drawings, and the claims.

Described herein is a communication system. The communication system may include a motor vehicle, a portable communication adapter separate from the vehicle and able to be coupled reversibly to a control device of the motor vehicle by use of a communication interface, and a vehicle-external coordination device. As described above, the communication adapter can be designed as a mobile terminal, for example as a smartphone or a tablet PC. Provision is made for the communication adapter to be able to be coupled reversibly to a control device of the motor vehicle. Such a reversible coupling can be effected, for example, via a wired plug connection between the communication adapter and the onboard diagnostic unit (OBD unit) of the motor vehicle. This connection can also be effected wirelessly, for example via a Bluetooth or a radio connection (for example WLAN—wireless local area network). The communication adapter is designed in such a way that it can be connected to the control device of the motor vehicle and disconnected therefrom again (non-destructively) by a vehicle occupant, for example by a vehicle driver without further technical measures. The control device can be based on a control unit or a group of several control units of the motor vehicle.

According to the disclosure, the communication adapter is set up to receive motor vehicle data describing a traffic behavior and/or a traffic environment of the motor vehicle from the control device of the motor vehicle. To this end, provision can be made for a correspondingly designed piece of software or application (app) to be installed on a storage medium of the communication adapter, the storage medium being designed for this purpose.

According to the disclosure, the communication adapter furthermore has a transmission/reception unit, by which it transmits the motor vehicle data to the vehicle-external coordination device. The transmission/reception unit can be realized, for example, as a mobile radio module and/or a WLAN radio module (WLAN—wireless local area network). In other words, the communication adapter can operate a data connection for a data transmission to the vehicle-external coordination device using the transmission/reception unit. The motor vehicle data transmitted in this way include, for example, data of a steering wheel angle sensor and/or turn signal and/or brake pedal sensor and/or accelerator pedal sensor and/or route information stored in a navigation unit of the motor vehicle. Moreover, the motor vehicle data can include information regarding a driving speed and/or an acceleration of the motor vehicle. The motor vehicle data can also include environmental data of the motor vehicle, for example optical environmental data recorded by way of a camera of the motor vehicle.

The communication adapter is furthermore designed to receive by use of the transmission/reception unit warning data generated by the vehicle-external coordination device and describing a traffic behavior and/or a traffic environment of at least one other motor vehicle. The warning data describe, for example, the approach of another motor vehicle at a speed above a predetermined threshold value. However, the warning data can also include information regarding a traffic environment, for example regarding an emergence of traffic in the environment of the other motor vehicle.

In other words, the communication adapter can operate a two-sided data exchange or a two-way data exchange with the coordination device using the transmission/reception unit and/or indirectly for at least one other motor vehicle using the coordination device.

According to the disclosure, the communication adapter may be designed to initiate at least one traffic-coordinating measure on the basis of the warning data. Such a measure can include, for example, of an output of a warning to a motor vehicle driver.

Aspects of the disclosure result in the advantage that, by use of the communication adapter described herein, motor vehicles that do not have irreversibly installed corresponding technical prerequisites from the beginning can be included in a communication between further road users. In addition, the communication adapter can be used subsequently or alternately in more than one motor vehicle on account of its portability.

The communication system also includes embodiments that result in additional advantages.

An example embodiment makes provision for the communication adapter to be designed first to write the motor vehicle data into a predetermined buffer store and, depending on the presence of a satisfied release criterion, to transmit the motor vehicle data to the vehicle-external coordination device by use of the transmission/reception unit. In other words, the communication adapter does not transmit the motor vehicle data to the coordination device directly but instead first stores the data in a buffer store. Such a buffer store can be realized, for example, as an Internet-based cloud store. The motor vehicle data buffer-stored in this way may be transmitted to the vehicle-external coordination device only when a satisfied release criterion is present. In other words, there is no transmission if the release criterion has not been satisfied. Such a release criterion can include, for example, of a successful authentication and/or a successful proof of identity of another motor vehicle requesting the motor vehicle data. This results in the advantage that the motor vehicle data are buffer-stored in a protected area. It is thus advantageously possible to prevent misuse of the motor vehicle data.

Within the context of data protection, provision may be made for the transmission of the motor vehicle data from the control device of the motor vehicle to the communication adapter to also be initiated only if an access permission to be effected on the motor vehicle side has been granted.

A further embodiment makes provision for the communication adapter to be designed to identify its own position data relating to the current position thereof by use of a reception unit, installed in the communication adapter, for a position signal of a global navigation satellite system (GNSS) and to transmit its own position data to the vehicle-external coordination device by use of the transmission/reception unit. In the case of a communication adapter designed as a mobile terminal, for example as a smartphone, such a reception unit can be realized by a GPS receiver (GPS—global positioning system). This results in the advantage that, in addition to the mentioned motor vehicle data, position data and/or acceleration data of the communication adapter itself can also be transmitted to the vehicle-external coordination device. This own position data and/or acceleration data of the communication adapter itself form a useful extension to the described motor vehicle data.

Also described herein is a vehicle-external coordination device for a communication system. The vehicle-external coordination device is designed to receive as input data from at least one communication adapter motor vehicle data of a respective motor vehicle representing an end-of-life vehicle and/or own position data of the at least one communication adapter. In connection with the communication system described herein, an end-of-life vehicle is a motor vehicle whose fixedly installed technical infrastructure does not provide its own data exchange with the coordination device and/or an autonomous motor vehicle. An end-of-life vehicle is, for example, a motor vehicle without an autonomous driving function. The coordination device is furthermore designed to additionally receive respective motor vehicle data and/or respective vehicle position data from further, for example autonomous, motor vehicles. The coordination device can be designed, for example, as a central Internet server or as a cloud server. However, the coordination device can also be realized as a computation unit of an autonomous motor vehicle, which controls a driving behavior of the autonomous motor vehicle in the manner of an autopilot.

In any case, the coordination device described herein is designed to generate warning data describing a respective upcoming traffic situation for the respective motor vehicle based on the input data and to send the warning data to the at least one communication adapter and/or to at least one of the motor vehicles.

Moreover, also described herein is a communication adapter for a communication system, which is designed to establish a communication connection to at least one further, for example autonomous, motor vehicle and/or to a vehicle-external coordination device of the communication system by use of an air interface, to receive warning data and to initiate at least one traffic-coordinating measure on the basis of the warning data. As described above, the communication adapter can be designed as a mobile terminal, for example as a smartphone or as a tablet PC. The air interface can be designed, for example, as a radio interface, that is to say as a wireless interface. For example, a data transmission via radio waves or infrared waves can take place by use of the air interface.

In accordance with an example embodiment, the communication adapter may include a display area for optically displaying the warning data transmitted by the vehicle-external coordination device. The display area can be realized, for example, by way of a pixel-based screen device. In accordance with the example embodiment, an optical display of transmitted warning data is provided as a traffic-coordinating measure. This can be realized, for example, by a flashing and/or an illumination and/or the display of a warning symbol on the display area.

As an alternative or in addition, provision can be made for the communication adapter to have an acoustic output interface for emitting acoustic warning signals corresponding to the warning data as a traffic-coordinating measure.

Provision can also be made for vehicle-internal media output units, for example a radio installed in the motor vehicle and/or a screen installed in the motor vehicle, to be used as the output of respective devices that realize acoustic and/or optical warning signals.

In addition or as an alternative, provision may be made for haptic feedback to be effected as the output of respective warning data to a vehicle occupant. This can be done, for example, by way of vibration of the steering wheel.

In accordance with an example embodiment, the communication adapter may include a charging interface for electrical connection to an on-board voltage network of the motor vehicle for electrically charging an electrical store of the communication adapter. This results in the advantage that the communication adapter can be supplied with electrical energy during operation.

Also described herein is a method for carrying out a communication in a communication system having a motor vehicle, a portable communication adapter separate from the vehicle and able to be coupled reversibly to a control device of the motor vehicle by use of a communication interface, and a vehicle-external coordination device.

The method described herein includes the communication adapter receiving motor vehicle data describing a traffic behavior and/or a traffic environment of the motor vehicle from the control device. The communication adapter on the one hand transmits the motor vehicle data to the vehicle-external coordination device by use of a transmission/reception unit and on the other hand receives warning data generated by the vehicle-external coordination device and describing a traffic behavior and/or a traffic environment of at least one other motor vehicle. The communication adapter initiates at least one traffic-coordinating measure on the basis of the warning data.

Also described herein is a storage medium (e.g., a non-transitory storage medium) having a program code, which is configured to carry out the method described herein when executed by a processor device of a mobile terminal. To this end, the processor device can have at least one microprocessor and/or at least one microcontroller and/or at least one FPGA (field-programmable gate array) and/or at least one DSP (digital signal processor). Furthermore, the processor device can have the program code which is configured to carry out one or more of the embodiments of the method described herein when executed by the processor device. The program code can be stored in a data memory of the processor device. The storage medium can be a constituent part of the mobile terminal, that is to say the data memory of the processor device of the terminal, or it may be a data memory of an Internet server for application software, that is to say a sales provider for what are known as apps.

The disclosure also includes developments of the coordination device described herein, the communication adapter described herein, the method described herein for carrying out a communication, and the storage medium described herein, which have features as have already been described in connection with the developments of the communication system described herein. For this reason, the corresponding developments of the coordination device, the communication adapter, the method, and the storage medium, are not described again here.

A respective motor vehicle within the context of the disclosure is for example designed as an automobile, for example as a car or truck, or as a passenger bus or motorcycle.

The disclosure also includes the combinations of the features of the example embodiments described herein.

BRIEF DESCRIPTION OF THE DRAWINGS

These and other aspects and advantages will become more apparent and more readily appreciated from the following description of the example embodiments, taken in conjunction with the accompanying drawings of which:

FIG. 2 is a schematic illustration of a further embodiment of the communication system described herein.

DETAILED DESCRIPTION

Figure 1:
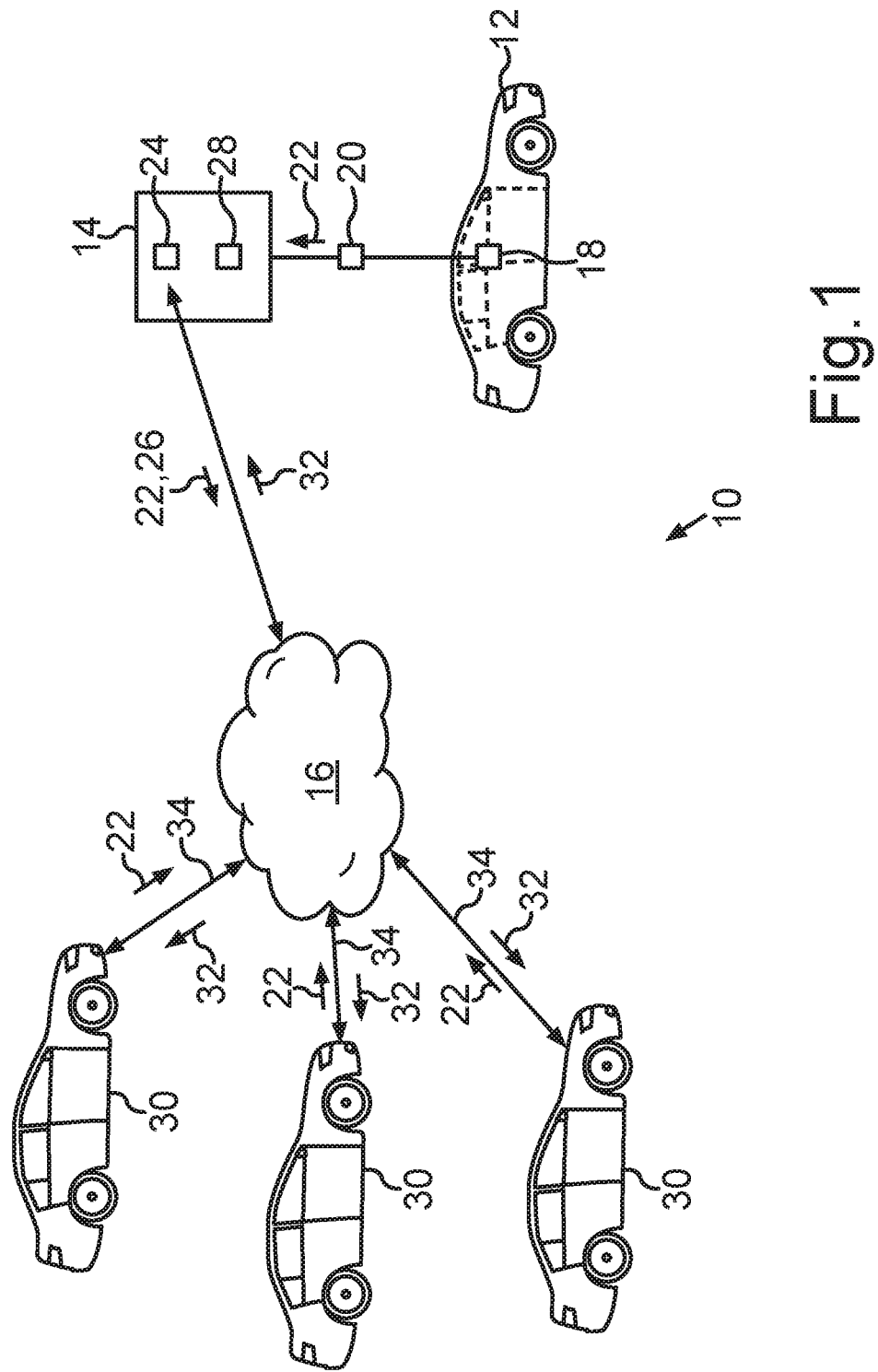
FIG. 1 is a schematic illustration of an embodiment of the communication system described herein.

Reference will now be made in detail to example embodiments which are illustrated in the accompanying drawings, wherein like reference numerals refer to like elements throughout.

The embodiments described below are example embodiments. In the example embodiments, the described components of the embodiments are each individual features which should be considered independently of one another and which each also develop the disclosure independently of one another. Therefore, the disclosure is intended also to include combinations of the features of the embodiments other than those illustrated. Moreover, the embodiments described can also be supplemented with further features of the already described features.

In the drawings, identical reference signs respectively denote functionally identical elements.

FIG. 1 shows an embodiment of a communication system 10 having a motor vehicle 12, a communication adapter 14, and a coordination device 16. The motor vehicle 12 may be a non-autonomous motor vehicle or generally an end-of-life vehicle in the aforementioned sense, that is to say it cannot use the coordination device 16 of its own accord. The communication adapter 14 can be designed, for example, as a mobile terminal, for example as a smartphone. In the embodiment shown in FIG. 1, the coordination device 16 may be an Internet-based central server device.

In the embodiment shown in FIG. 1, the motor vehicle 12 has a control device 18, which is coupled to the communication adapter 14 by use of a communication interface 20. The communication interface 20 can be designed, for example, as a radio interface. The communication interface 20 can also be realized as a wired interface, for example as a USB port.

The communication adapter 14 may be designed to receive motor vehicle data 22 from the control device 18 of the motor vehicle 12. As described above, the motor vehicle data 22 can be steering wheel angle sensor data and/or turn signal data and/or brake pedal sensor data and/or accelerator pedal sensor data, for example. The motor vehicle data 22 can also include route information, which can be stored, for example, in a navigation system of the motor vehicle 12, which is not illustrated here. In any case, the motor vehicle data 22 describe a current and/or a future traffic behavior and/or a traffic environment of the motor vehicle 12.

As shown in FIG. 1, the communication adapter 14 has a transmission/reception unit 24. The transmission/reception unit 24 can be a mobile radio module and/or a WLAN radio module, for example. The communication adapter 14 can transmit the motor vehicle data 22 to the vehicle-external coordination device 16 by use of the transmission/reception unit 24. In addition, the communication adapter 14 can transmit own position data 26 relating to the actual position thereof to the vehicle-external coordination device 16 using the transmission/reception unit 24. In order to identify the own position data 26 thereof, the communication adapter 14 in the embodiment shown in FIG. 1 has a reception unit 28 for a position signal of a GNSS (GNSS—global navigation satellite system).

Furthermore, the transmission/reception unit 24 of the communication adapter 14 shown in FIG. 1 is used to receive warning data 32 generated by the vehicle-external coordination device 16 and describing a current and/or future traffic behavior and/or a traffic environment of at least one other motor vehicle 30. This requires each of the other motor vehicles 30 to operate a respective communication connection 34 to the coordination device 16. The coordination device 16 accordingly receives respective motor vehicle data 22 of a respective motor vehicle 30 and sends warning data 32 to the respective other motor vehicles 30 via a respective communication connection 34. In other words, the motor vehicles 12, 30 are networked via the coordination device 16.

FIG. 1 thus shows an embodiment of a communication system 10, wherein a communication between the involved motor vehicles 12, 30 is realized by incorporating the vehicle-external coordination device 16.

FIG. 2 now shows a further embodiment of the communication system 10 with reference to the components described in connection with FIG. 1. In the embodiment shown in FIG. 2, the coordination device 16 is realized as an autopilot device of the respective other motor vehicle 30 involved in the communication. The communication adapter 14 of the motor vehicle 12 and the coordination device 16 communicate with one another by use of an air interface 36. In the course of this communication, the communication adapter 14 transmits respective motor vehicle data 22 and/or own position data 26 to the coordination device 16 and receives respective warning data 32 via the communication connection 34. This car-to-car communication described here can take place in the form of a standardized message via the air interface 36 in a defined microwave range. The other motor vehicle 30 advantageously has at least one camera 38, by which the motor vehicle 12 can be identified. The own position data 26 transmitted by the communication adapter 14 can be matched to the position that has been identified based on a camera image of the camera 38.

By way of example, the described embodiments can be based on the following situations.

An autonomous motor vehicle 30 identifies a motor vehicle 12 that unexpectedly turns to the right in order to turn off at an exit. If there is a corresponding danger, the motor vehicle 30 will brake; this is an unpleasant experience for the occupant. If the motor vehicle 30 now has the option to request in real time the chronologically subsequent route information (for example the next 200 m) for the motor vehicle 12 via the smartphone link (that is to say via the communication connection 34 between the coordination device 16 and the communication adapter 14), the motor vehicle can anticipate corresponding maneuvers and take these into account in its own driving behavior. An intense braking and a change of lane can also be sent from the motor vehicle 12 to the motor vehicle 30 (in a particular radius). Although the autonomous systems will identify such driving situations reliably, an additional information source by way of the initiating motor vehicle 12 would contribute to a higher reliability of the travel time.

In a further example situation, a motor vehicle 30 wishes to turn onto a major road from a narrow side street. A motor vehicle 12 wishes to drive into the narrow side street, so waits and holds the traffic up. The motor vehicle 30 identifies the active turn signal and, if present, even the headlight flash by the motor vehicle 12, but not gesturing of the driver. However, the motor vehicle 30 will not drive because it does not have right of way. The typical option would now be to allow the driver to take over. As an alternative, the route can now be pursued via the linked communication via smartphone (that is to say via the communication connection 34 between the coordination device 16 and the communication adapter 14). First, the driver of the motor vehicle 30 is pointed out as an additional observer. Secondarily, the route, turn signal and/or speed is requested from the motor vehicle 12. If the information from the request and that of the camera 38 of the motor vehicle 30 correspond, the driving process is initiated. For additional process safety, a message is sent to the smartphone (that is to say the communication adapter 14) in the motor vehicle 12, the message then announcing a driving process. In the meantime, the motor vehicle 30 monitors the steering and/or driving direction and speed for the motor vehicle 12 both via the camera 38 and also via the request. The motor vehicles 12, 30 can thus master such situations fully autonomously without intervention.

It is likewise of interest if the sensor data (that is to say the motor vehicle data 22) are also processed further in the cloud (that is to say the coordination device 16) and then distributed via the radio traffic service as information or warning data 32 (hazard warnings, collisions). This is an established system that can operate in a more up-to-date manner and thus to promote safety by way of the additional warnings or warning data 32. A link to the cloud (that is to say the coordination device 16) via a smartphone (that is to say a communication adapter 14) thus acts as an extension and can ensure access to information that is of a lower level from the overall traffic perspective but that is still important for the individual. Furthermore, a communication would be more directly and better possible. It is thus possible to use specifically pre-programmed messages in order to communicate between the motor vehicles 12, 30. Irrespective of whether the motor vehicle 30 is driven autonomously or not, it can send a message to another motor vehicle 12 linked to the communication.

In a further example situation, the motor vehicle 30 is looking for a parking space and the driver identifies that somebody is getting into a motor vehicle 12. Everything thus points to this parking space becoming free. Instead of using a headlight flash, gestures and other communication methods which will possibly not be seen anyway, a message can be sent to the motor vehicle 12. The prerequisite is a link via the smartphone 14 or likewise a motor vehicle 30 with the most up-to-date technology. An already stored message is thus transmitted, but the motor vehicle 30 subsequently also has to stop. This is also done in the autonomous mode. If the person drives, it has to be purposefully permitted at least with a corresponding safety release. For the motor vehicle 12, the link to the smartphone 14 is likewise a safety feature since when leaving a parking space the motor vehicle likewise receives a message if a motor vehicle 30 has right of way.

Within the context of the development of autonomous vehicles, smart cities, and intelligent traffic systems, the transmission of data in real time is at the center thereof. The data of the vehicle sensors are intended to be exchanged with the systems of other vehicles and for example in real time via the cloud. The aim is thus to be able to process hazards, congestion and other safety-relevant information regarding traffic and mobility more rapidly. The intention is then for this to promise a high degree of safety, a better flow of traffic, and a more intelligent driving operation of the autonomous vehicle.

Old stocks of vehicles hinder the communication between fully autonomous vehicles. This is because the functions can operate usefully only with an involvement of from 10 to 15% of all vehicles in such a communication system.

Vehicles that are not compatible with the entire fleet can be linked to the data exchange of the autonomous vehicles by the described connection using a smartphone app. A real-time link to the autonomous fleet is ensured by use of software or an app installed on the devices of the customer. The majority of users will use the new mobile radio standard (5G) using their smartphone first before it is used in the large majority of vehicles. A link via the smartphone will thus bring the vehicle fleet to the newest mobile radio standard much more quickly.

However, the software for example may require access to information of the motor vehicle 12. An access permission must be granted via a software update of the control unit (that is to say the control device 18). Similar to reading out the error memory, information can now be read out only using the enabled smartphone and the app. Access to data of the steering wheel angle sensor, turn signal, brake and accelerator pedal sensor (pedal encoder), and route information are of interest in this case. However, this information is not intended to be stored or transmitted on account of data protection reasons. The information is intended to be able to be stored temporarily as snapshots in a folder (that is to say a buffer store) separated from the system. The information shared in the cloud (in the coordination device 16) is intended to be restricted to the status "vehicle capable of communication". The motor vehicle data 22 are intended to be generated and passed on only upon request by an autonomous motor vehicle 30 that is graded as trustworthy, that is to say when the release criterion is satisfied.

Both the communication and the data transmission can be realized in this case via the cloud and using the 5G network. As an alternative, a transmission by vehicle-to-vehicle or car-to-car communication (V2V, C2C) as a radio-telegram is also conceivable. It is important here that the motor vehicle 30 is located at a meaningful distance. The request must thus come from a legitimate interested party. Furthermore, only a motor vehicle 30 in an autonomous mode should be able to request corresponding information. The application can thus obtain information regarding the route, braking and steering behavior as well as speed and acceleration. This information is produced on the one hand by the motor vehicle 12 and on the other hand by the satellite navigation of the smartphone.

In principle, therefore, all information that is collected by the autonomous fleet of motor vehicles 30 is also accessible to the owners of motor vehicles 12 representing end-of-life vehicles. If a motor vehicle 30 thus identifies hazards in the form of collisions, people or wildlife on the road, a warning is of course sent to the other autonomous motor vehicles 30 but also to all owners of the smartphone application. Depending on the location of the smartphone or communication adapter 14, relevant information is thus filtered by the radius or along a road.

The information flow functions in both directions, that is to say from motor vehicles 12 to motor vehicles 30 and vice versa.

The transition to fully autonomous traffic circulation can be realized by the communication system and basic networking is provided. Furthermore, the increased traffic safety is an advantage.

In principle, previous systems are used in the motor vehicles 12, 30, such as a Bluetooth connection and camera systems. The connection of a motor vehicle 12 to the smartphone is already known; for a good user experience, a charging process of the smartphone must be able to be realized at the same time (inductively or as a connection via a cable) in order to realize the high intensity of use.

Both autonomous motor vehicles 30 and the smartphone application in motor vehicles 12 representing end-of-life vehicles can process and exchange the required information via satellite navigation/mobile radio standard (5G). The cloud is at the center in these scenarios; computation powers will thus primarily be executed outside of the motor vehicle.

The V2V or C2C communication is likewise possible in the form of a standardized message via the air interface 36 in the defined microwave range. Ultimately, the assignment of the motor vehicles 12 identified via the camera 38 must be matched to the present GPS data of the motor vehicles 12, 30 in order to ensure that the correct motor vehicle 12, 30 is sent a request/message.

Overall, the examples show how the communication system described herein can provide a communication between motor vehicles 30 of an autonomous fleet and motor vehicles 12 representing old stocks.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in *Superguide v. DIRECTV*, 358 F3d 870, 69 USPQ2d 1865 (Fed. Cir. 2004). That is the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C. In addition, the term "and/or" includes a plurality of combinations of relevant items or any one item among a plurality of relevant items. That is, the scope of the expression or phrase "A and/or B" includes all of the following: (1) the item "A", (2) the item "B", and (3) the combination of items "A and B".

The invention claimed is:

1. A communication system, comprising:
   a motor vehicle, among motor vehicles, including a control device;
   a vehicle-external coordination device; and
   a portable communication adapter separate from the motor vehicle and reversibly coupleable to the control device via a communication interface, the communication adapter being configured to:
   receive motor vehicle data describing a traffic behavior and/or a traffic environment of the motor vehicle from the control device,
   write the motor vehicle data received from the control device into a predetermined buffer store,
   when a release criterion is satisfied, transmit, the motor vehicle data written into the predetermined buffer store, to the vehicle-external coordination device via a transmission/reception unit of the communication adapter, the release criterion including a successful authentication and/or a successful proof of identity of ran other motor vehicle, among the motor vehicles, requesting the motor vehicle data,
   when the release criterion is not satisfied, to not transmit the motor vehicle data written into the predetermined buffer store to the vehicle-external coordination device via the transmission/reception unit,
   receive warning data generated by the vehicle-external coordination device describing a traffic behavior and/or a traffic environment of the other motor vehicle, and initiate a traffic-coordinating measure based on the received warning data describing the traffic behavior and/or the traffic environment of the other motor vehicle, the traffic-coordinating measure including an output of a warning to an occupant of a motor vehicle, among occupants of the motor vehicles.

2. The communication system as claimed in claim 1, wherein the communication adapter is configured to identify position data of the communication adapter relating to a current position of the communication adapter via a reception unit, installed in the communication adapter, based on a position signal of a global navigation satellite system, and to transmit the position data to the vehicle-external coordination device via the transmission/reception unit.

3. The communication system as claimed in claim 1, wherein the predetermined buffer store is disposed on a cloud server.

4. The communication system as claimed in claim 1, wherein the motor vehicle data includes at least one of information relating to a steering wheel angle sensor, a turn signal, a brake pedal sensor, an accelerator pedal sensor, and route information of the motor vehicle.

5. A communication adapter for a communication system, comprising:
    a transmission/reception unit;
    an air interface configured to operate a communication connection to at least one of a first motor vehicle and a vehicle-external coordination device of the communication system based on at least one of radio waves, infrared waves, and micro-waves; and
    a processor configured to:
        receive first warning data from at least one of the first motor vehicle and the vehicle-external coordination device via the communication connection,
        initiate a first traffic-coordinating measure based on the first warning data received from the at least one of the first motor vehicle and the vehicle-external coordination device,
        receive motor vehicle data describing a traffic behavior and/or a traffic environment of a second motor vehicle from a control device of the second motor vehicle,
        write the motor vehicle data received from the control device of the second motor vehicle into a predetermined buffer store,
        when a release criterion is satisfied, transmit the motor vehicle data written into the predetermined buffer store to the vehicle-external coordination device via the transmission/reception unit, the release criterion including a successful authentication and/or a successful proof of identity of a motor vehicle other than the second motor vehicle which requests the motor vehicle data,
        when the release criterion is not satisfied, to not transmit the motor vehicle data written into the predetermined buffer store to the vehicle-external coordination device via the transmission/reception unit,
        receive second warning data generated by the vehicle-external coordination device describing a traffic behavior and/or a traffic environment of the second motor vehicle, via the transmission/reception unit, and
        initiate a second traffic-coordinating measure based on the second warning data generated by the vehicle-external coordination device, the second traffic-coordinating measure including an output of a warning to a motor vehicle occupant of the second motor vehicle.

6. The communication adapter as claimed in claim 5, further comprising a display area to optically display the second warning data generated by the vehicle-external coordination device,
    wherein the second traffic-coordinating measure includes the second warning data displayed on the display area.

7. The communication adapter as claimed in claim 5, further comprising an acoustic output interface to emit acoustic warning signals corresponding to the second warning data,
    wherein the second traffic-coordinating measure includes the acoustic warning signals emitted by the acoustic output interface.

8. The communication adapter as claimed in claim 5, further comprising a charging interface to be electrically connected to an on-board voltage network of the first motor vehicle so as to electrically charge an electrical store of the communication adapter.

9. The communication adapter as claimed in claim 5, wherein the first motor vehicle is an autonomous motor vehicle.

10. The communication adapter as claimed in claim 5, further comprising a reception unit configured to identify position data of the communication adapter relating to a current position of the communication adapter, based on a position signal of a global navigation satellite system,
    wherein the processor is configured to transmit the position data to the vehicle-external coordination device via the transmission/reception unit.

11. The communication adapter as claimed in claim 5, wherein the predetermined buffer store is disposed on a cloud server.

12. The communication adapter as claimed in claim 5, wherein the motor vehicle data includes at least one of information relating to a steering wheel angle sensor, a turn signal, a brake pedal sensor, an accelerator pedal sensor, and route information of the second motor vehicle.

13. A method for carrying out a communication in a communication system which includes a motor vehicle, among motor vehicles, each of the motor vehicles having a control device, a portable communication adapter separate from the motor vehicle and reversibly coupleable to the control device, and a vehicle-external coordination device, the method comprising:
    receiving, by the communication adapter, motor vehicle data describing a traffic behavior and/or a traffic environment of the motor vehicle from the control device;
    writing, by the communication adapter, the motor vehicle data received from the control device into a predetermined buffer store;
    when a release criterion is satisfied, transmitting the motor vehicle data to the vehicle-external coordination device via a transmission/reception unit of the communication adapter, the release criterion including a successful authentication and/or a successful proof of identity of an other motor vehicle, among the motor vehicles, requesting the motor vehicle data;
    when the release criterion is not satisfied, not transmitting the motor vehicle data written into the predetermined buffer store to the vehicle-external coordination device via the transmission/reception unit;
    receiving, by the communication adapter, warning data generated by the vehicle-external coordination device describing a traffic behavior and/or a traffic environment of the other motor vehicle; and initiating a traffic-coordinating measure based on the received warning data describing the traffic behavior and/or the traffic environment of the other motor vehicle, the traffic-coordinating measure including an output of a warning to an occupant of a motor vehicle, among occupants of the motor vehicles.

14. The method as claimed in claim 13, further comprising:

identifying, by the communication adapter, position data of the communication adapter relating to a current position of the communication adapter via a reception unit, installed in the communication adapter, based on a position signal of a global navigation satellite system; and transmitting the position data to the vehicle-external coordination device via the transmission/reception unit.

15. The method as claimed in claim 13, wherein the predetermined buffer store is disposed on a cloud server.

16. The method as claimed in claim 13, wherein the motor vehicle data includes at least one of information relating to a steering wheel angle sensor, a turn signal, a brake pedal sensor, an accelerator pedal sensor, and route information of the motor vehicle.

17. A non-transitory storage medium having a program code, that when executed by a processor of the communication adapter, is configured to carry out the method as claimed in claim 13.

* * * * *

UNITED STATES PATENT AND TRADEMARK OFFICE
CERTIFICATE OF CORRECTION

PATENT NO. : 11,600,176 B2
APPLICATION NO. : 17/618289
DATED : March 7, 2023
INVENTOR(S) : Moritz Otto It is certified that error appears in the above-identified patent and that said Letters Patent is hereby corrected as shown below:

In the Claims

Column 10, Line 58:
In Claim 1, delete "ran" and insert --an--.

Signed and Sealed this
Eighteenth Day of April, 2023

Katherine Kelly Vidal
*Director of the United States Patent and Trademark Office*